Dec. 6, 1949     N. WHITEHEAD     2,490,111
APPARATUS FOR LAMINATING ARTICLES
Filed April 13, 1946
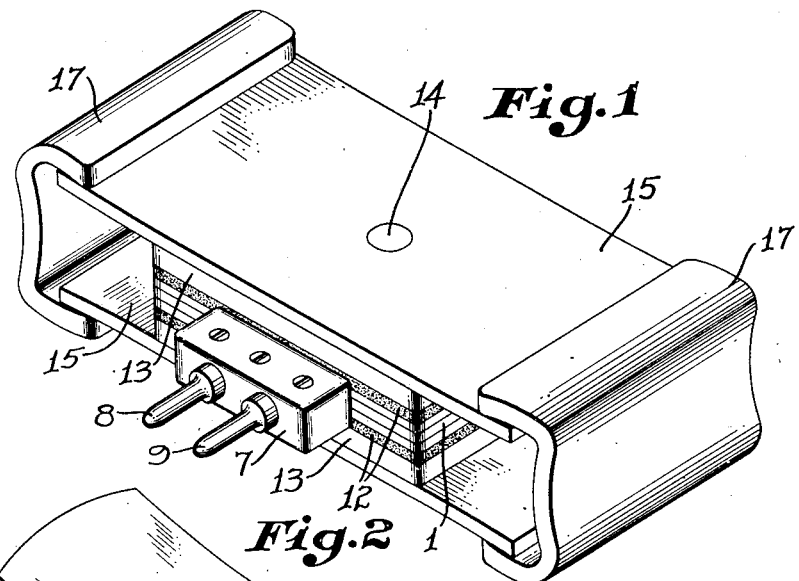
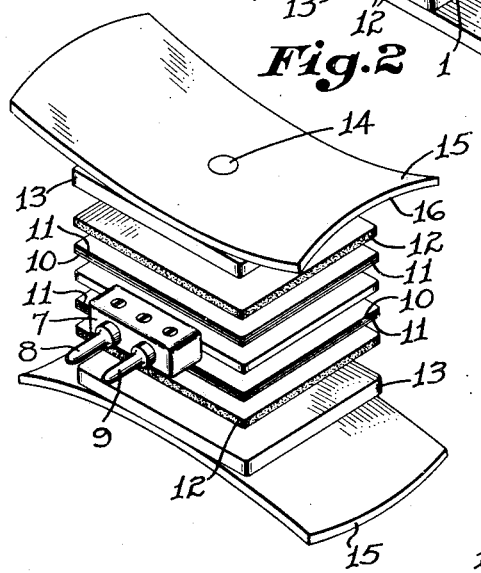
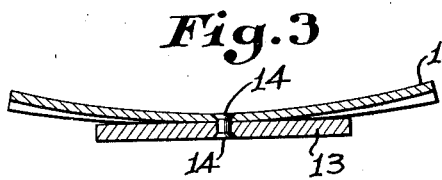
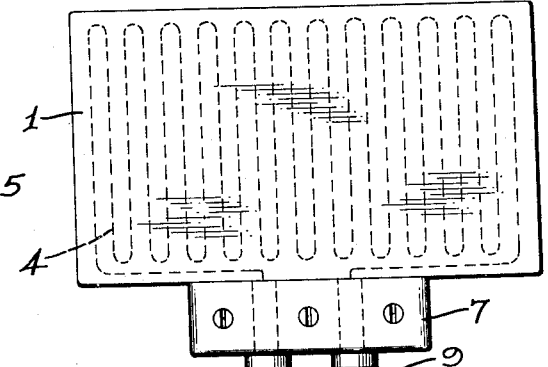
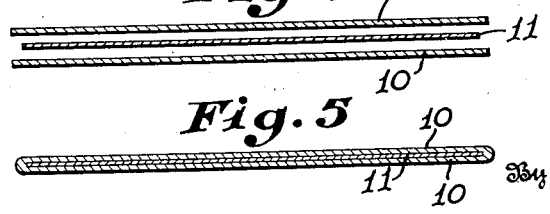
Inventor
Ned Whitehead
By Lyon & Lyon
Attorneys Patented Dec. 6, 1949

2,490,111

UNITED STATES PATENT OFFICE 2,490,111

APPARATUS FOR LAMINATING ARTICLES

Ned Whitehead, Los Angeles, Calif.

Application April 13, 1946, Serial No. 662,016

3 Claims. (Cl. 154—1)

My invention relates to the manufacture of identification cards and the like. These cards consist of a transparent cover of thermoplastic material with a paper or other opaque core carrying identification matter and photographs. The thermoplastic material is applied to the core by the use of heat and pressure so that the thermoplastic material seals itself with the paper core and around the edges to itself. While other devices have been used for making these laminated identification cards one of the difficulties encountered is that the thermoplastic is sealed at the ends but is often unsealed at the side edges. This failure allows tampering with the card underneath the thermoplastic. It is therefore an object of my invention to provide a laminating press which will insure a sealing of the thermoplastic around all four edges.

Another object of my invention is to provide a heating unit incorporated within the laminating apparatus. Other devices are used to compress the articles to be laminated and while compressed they are subjected to external heat which heats the compressing device as well as the articles to be laminated. By the use of my invention the external heating device which usually constitutes an oven is eliminated.

Other objects and advantages of my invention will be apparent from the following description in the preferred embodiments thereof.

In the drawings:

Figure 1 is a perspective view of my laminating apparatus;

Figure 2 is a perspective view showing the assembly of my apparatus in an exploded condition;

Figure 3 is a longitudinal cross section of the spring plate element;

Figure 4 is an exploded cross section of the article to be laminated; and

Figure 5 is a cross section of the finished laminated identification card;

Figure 6 is an exploded cross section of the heating element; and

Figure 7 is a cross section of the assembled heating element;

Figure 8 is a plan view of the heating element.

Referring to the drawings a laminating press constructed in accordance with my invention has a heating element which is formed of a box 1 preferably of copper or other high'y conductive material which has placed therein a layer of insulating material 2 such as mica or the like upon which is placed a sheet 3 of mica around which is wound a coil 4 which forms an electrical heating coil. The usual material in which this coil is made is nickel chrome steel. Placed on top of the sheet 3 is another layer of insulating material 2a and placed on top of this layer 2a is a lid 5 of material similar to the box 1. This lid 5 is compressed inwardly to hold the inner layers and is then welded along the ends 6 to hold the same in position. Extending from one side of the box 1 is a terminal plate 7 having the jacks 8 and 9 connected to the ends of the coil 4 to permit an electrical circuit to be connected thereto.

This heating element is the center of my laminating press and on each side of it are placed one or more sets of identification cards that are to be laminated. These comprise the sheets 10 of thermoplastic with the paper identification material 11 placed therebetween. If more than one set of cards are placed on each side of the heating element a thin sheet of metal such as stainless steel should be used to separate each set of cards. Upon the outside of these cards are positioned resilient pad members 12. Upon top of the pad members 12 are positioned rigid steel plates 13 having riveted thereto at 14 the bowed spring plates 15. While it is old to use bowed spring plates which are bowed outwardly in one direction as shown in the drawings, this usually results in the cards being laminated together at the ends but on the side edges a perfect union is not accomplished. To overcome this difficulty I have found that the bowed spring plates 15 should be given an undersurface which has a concave contour 16 in the opposite direction to the outwardly bowed plate. In other words the spring plate 15 in its lateral direction bows inwardly towards the plate 12 while in its longitudinal direction it bows outwardly. This last bowing insures pressure along the sides of the cards and a perfect lamination is secured.

After the articles above described have been assembled in the positions indicated the same are put in any kind of a press and squeezed together until they are in the position shown in Figure 1. This flattens the spring plates 15 against the pressure plates 12 and the unit is then locked in a compressed position by pressing the U clamps 17 over the opposite ends of the unit so that they engage the ends of the spring plate 15 and hold them together after the press is opened. After removing this unit from the press they are connected by the jacks 8 and 9 to a suitable source of electrical current and heated to the required temperature. After the same is heated it is cooled to set the cards and then returned to the press and the U clamps 17 removed. In this way a great many cards can be laminated without tying up the high pressure press while each sheet of cards is heated and then cooled.

While I have described the preferred embodiments of my invention I am not limited to any of the details of description herein set forth except as described in the following claims.

I claim:

1. Apparatus for maintaining flat articles under pressure and heat, comprising an assembly consisting of: a heating element; a pair of resilient pad members disposed exterior of said heating elements and adapted to have articles to be laminated inserted between said pad members and said heating elements; a pair of substantially flat rigid members positioned exterior of said pad members for compressing them; a pair of bowed spring members exterior of said rigid plate members, said spring members being bowed outwardly in one direction and inwardly in the opposite direction, and adapted to flatten against said rigid plate member by application of external force; and means engageable with the end portions of said spring members at opposite ends of the entire assembly for holding said end portions together and maintaining said spring members in substantially flat relation against said rigid plates.

2. Apparatus for maintaining flat articles under pressure and heat, comprising an assembly consisting of: a heating element; said heating element comprising a heat conducting metallic box containing an electrical heating coil and means for insulating said core from said box; a pair of resilient pad members disposed exterior of said heating elements and adapted to have articles to be laminated inserted between said pad members and said heating elements; a pair of substantially flat rigid members positioned exterior of said pad members for compressing them; a pair of bowed spring members exterior of said rigid plate members, said spring members being bowed outwardly in one direction and inwardly in the opposite direction, and adapted to flatten against said rigid plate member by application of external force; and means engageable with the end portions of said spring members at opposite ends of the entire assembly for holding said end portions together and maintaining said spring members in substantially flat relation against said rigid plates.

3. Apparatus for maintaining flat articles under pressure and heat, comprising an assembly consisting of: a heating element; said heating element comprising a heat conducting metallic box, a lid for said box attached thereto, layers of insulating material adjacent the floor and lid of said box, an electrical heating coil wound on insulating material between said layers of insulating material; a pair of resilient pad members disposed exterior of said heating elements and adapted to have articles to be laminted inserted between said pad members and said heating elements; a pair of substantially flat rigid members positioned exterior of said pad members for compressing them; a pair of bowed spring members exterior of said rigid plate members, said spring members being bowed outwardly in one direction and inwardly in the opposite direction, and adapted to flatten against said rigid plate member by application of external force; and means engageable with the end portions of said spring members at opposite ends of the entire assembly for holding said end portions together and maintaining said spring members in substantially flat relation against said rigid plates.

NED WHITEHEAD.

REFERENCES CITED

The following references are of record in the file of this patent:

UNITED STATES PATENTS

| Number | Name | Date |
|---|---|---|
| 1,417,993 | Heeren | May 30, 1922 |
| 2,329,867 | Whitehead | Sept. 21, 1943 |